UNITED STATES PATENT OFFICE.

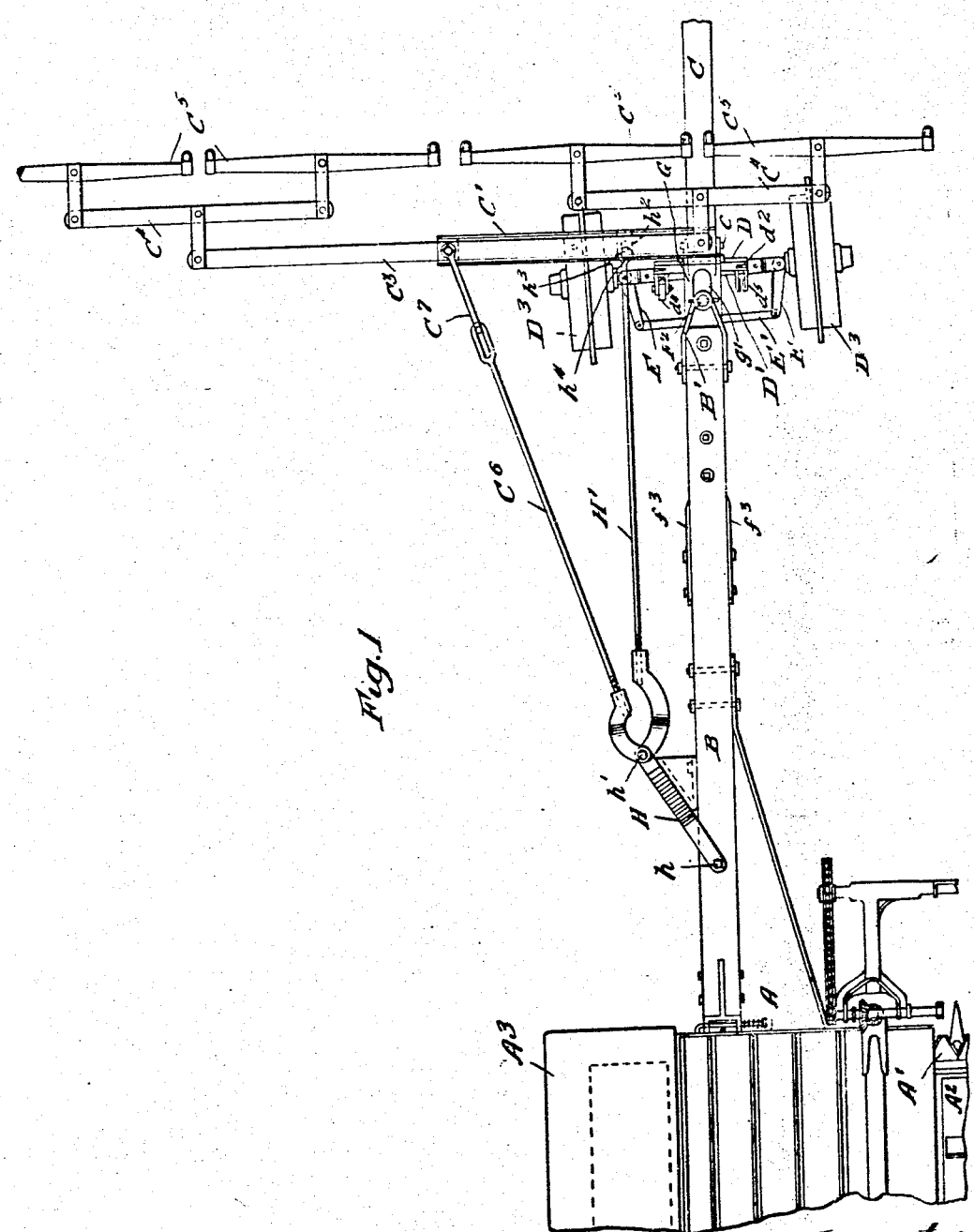

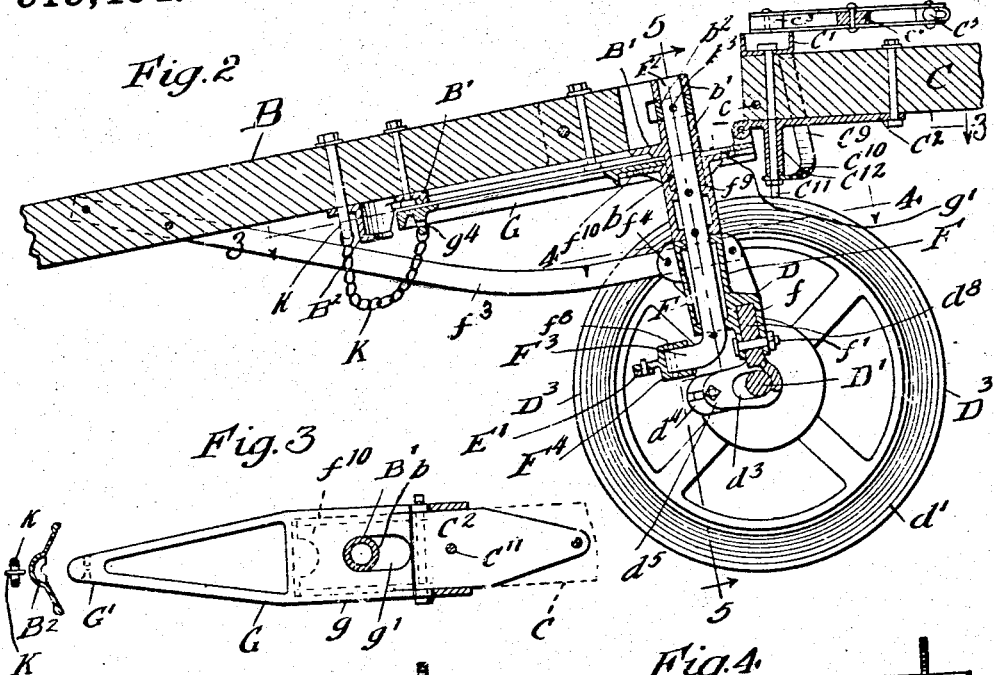

WILLIAM M. WADLEIGH, OF CHICAGO, ILLINOIS.

SHORT-TURNING TWO-WHEELED TONGUE-TRUCK FOR HARVESTERS AND OTHER MACHINES.

No. 919,404.

Specification of Letters Patent.

Patented April 27, 1909.

Application filed August 9, 1906. Serial No. 329,846.

*To all whom it may concern:*

Be it known that I, WILLIAM M. WAD-LEIGH, a citizen of the United States, residing in Chicago, in the county of Cook and State of Illinois, have invented a new and useful Improvement in Short-Turning Two-Wheeled Tongue-Trucks for Harvesters and other Machines, of which the following is a specification.

My invention relates to improvements in short turning two wheeled tongue trucks for harvesters, reapers, mowers and other machines.

The object of my invention is to provide a two wheeled tongue truck for harvesters and other machines of a strong, simple, efficient and durable construction, capable of being turned shortly, or sharply at right angles, as required in harvesters to keep the cut corners of the grain square, by means of which the side draft of the machine may be effectually resisted, neutralized or counteracted, in which the tendency of the harvester or machine to run into or out of the grain may be effectually overcome or prevented, in which the stubbleward inclination of the truck wheels will automatically regulate or accommodate itself to the amount of side draft of the machine as the same varies from time to time owing to varying conditions of grain or ground and by means of which the harvester or other machine may be readily and easily backed by the horses in a straight line, notwithstanding the pivotal connection between the tongue truck and the stub or supplemental tongue of the harvester or other machine.

My invention consists in the means I employ to practically accomplish this object or result. That is to say it consists in connection with the stub or supplemental tongue of the harvester or other machine and the main tongue, of a two wheeled tongue truck having a main axle and a pair of short or stub axles hinged thereto at the ends thereof upon which the wheels are mounted, and provided with steering arms and a steering bar, a connection between the steering bar and main tongue to operate the same therefrom, the same consisting preferably of a horizontal arm on the upright pivot pin which is rigidly secured to the main tongue and upon which the stub tongue turns horizontally and which pivotally connects the two piece or main and supplemental upright standards of the truck, a truck frame piece or bolster having a pivotal connection with the axle at one end and a slotted connection therewith at the other, so that the axle may oscillate horizontally to a limited extent to give the wheels the necessary stubbleward inclination to counteract or neutralize the side draft of the machine, a laterally rocking upright standard pivotally connected at its lower end to said truck frame piece or bolster and to which the stub or supplemental tongue is non rotatably connected, a supplemental upright standard having a slidable connection with the main tongue, the supplemental upright standard being horizontally rotatable in respect to the laterally rocking upright standard to give a pivotal connection between the stub tongue which is non rotatably connected to the lower standard and the main tongue which is non rotatably connected to the upper or supplemental standard, the main axle being free to oscillate horizontally in the truck frame piece or bolster to accommodate the stubbleward inclination of the wheels to variations in side draft and cause the main axle to assume a right angle position in respect to the tongues in backing, and the sliding backward movement of the main tongue in respect to the stub tongue serving to lock or hold the two tongues together in line with each other in backing, and the forward sliding movement of the main tongue in pulling serving to disengage the locking devices so as to leave the truck free to turn horizontally in respect to the stub tongue.

My invention also consists in the novel construction of parts and devices and in the novel combinations of parts and devices herein shown and described.

In the accompanying drawing forming a part of this specification, Figure 1 is a plan view of a short turning two wheeled tongue truck for harvesters embodying my invention, showing some portions of the harvester to which the truck is applied. Fig. 2 is a central longitudinal section. Fig. 3 is a horizontal section on line 3—3 of Fig. 2. Fig. 4 is a horizontal section on line 4—4 of Fig. 2, and Fig. 5 is a vertical section on line 5—5 of Fig. 2.

In the drawing, A represents a portion of the frame of the harvester or other machine to which my invention is applied, $A^1$ the sickle bar, $A^2$ the platform, and $A^3$ the drive wheel of the harvester or other machine. B is the stub or supplemental tongue connected to the harvester or other machine in the usual manner. C is the main tongue, C¹ the right angle evener supporting bar secured thereto, C³ the evener furnished with the necessary double-trees C⁴ and whiffle-trees C⁵ for hitching the horses to the machine; and C⁶ is the draft rod connected to the evener by a clevis C⁷ which preferably also embraces the evener support C¹. All these parts are or may be of any ordinary or suitable construction.

D is the truck frame piece or bolster through which the main axle D¹ extends and to which the short or stub axles D² are hinged by upright pivots $d$ so that these short or stub axles D² swing or turn horizontally in respect to the main axle. D³ are the truck wheels journaled upon the stub axles D², the same having in addition to their tread or rim, a side draft resisting annular flange or colter blade $d^1$. Each of the stub axles D² is provided with a steering arm E made in one piece therewith or rigidly connected thereto, and these steering arms E E are pivoted to a steering bar E¹ which connects the two steering arms.

The main axle D¹ is pivotally connected to the truck frame piece or bolster D at one end thereof by a removable upright pin or pivot $d^2$, so that the axle may vibrate in a horizontal plane about this pivot to a limited extent through a slotted guide $d^3$ at the other end of the truck frame piece or bolster D, and thus cause the truck axle to assume an inclined position in respect to the truck bolster or frame piece D and the wheels D² a stubbleward inclination to the line of cut or line of advance of the machine. The slotted guide $d^3$ of the bolster D is provided with an adjustable stop $d^4$ fitting between the ears $d^5$ and adjustably secured in any desired position by a clamp bolt $d^6$ which is furnished with a threaded nut $d^7$. The ears $d^5$ are preferably of malleable metal so that they will spring together sufficiently to properly clamp the movable stop. The stop may be placed to limit the stubbleward inclination of the truck wheels at any point desired.

To adapt the truck for use upon right or left hand harvesters or other machines, the truck bolster is preferably provided with a slot at each end for the pivot pin $d^2$ and with two slotted guides $d^3$. Instead of locating both these slotted guides at one end of the bolster, I prefer to locate one of these slotted guides at each end of the bolster as this gives greater uniformity in shape to the bolster or truck frame piece D, which I prefer to make of malleable iron.

F is an upright laterally rocking standard having a pivotal connection at its lower end with the truck frame piece or bolster D to adapt this standard to rock slightly from side to side to accommodate unevenness of ground. This hollow standard F has an upright slot $f$ in its lower end fitting an upright web $d^8$ on the truck bolster or frame piece D and connected thereto by a pivot pin or bolt $f'$ which permits the standard F to rock or vibrate laterally from side to side to a slight extent limited by the stops or shoulders $d^9 d^9$ on the web $d^8$. The upright laterally rocking standard F is non rotatably connected with the stub or supplemental tongue B by any suitable means, preferably by a pair of rods or straps $f^3 f^3$ secured one on each side of the standard F by a bolt $f^4$.

F¹ is a supplemental standard above the standard F, the two standards F F¹ being rotatably connected in respect to each other by the upright pivot pin F², the same being preferably a hollow tube. This upright pivot F² is non rotatably connected to the standard F¹ by a pin $f^5$ and is provided at its lower end with a horizontal steering arm F³ preferably integral therewith connected with the steering bar E¹ by a coupling F⁴ through a pin $f^6$, the coupling F⁴ being connected to the steering arm F³ by a slot and pin connection $f^7 f^8$ to permit of the necessary lateral rocking movement of the upright pivot pin F² with the upright standards F F¹ through which the pivot pin extends and which are connected by it.

The stub tongue B is provided with a hinge plate or member B¹ at its front end having a hub or pivot member $b$ fitting in an enlargement or circular recess $f^9$ in the upper standard F¹ and this hinge piece B¹ is further provided with eyes $b^1$ through which the pivot pin F² extends. The pivot pin is locked in position by a collar $b^2$ fitting between the eyes $b^1$ and secured to the pivot pin by a cross pin $b^3$. The upper or supplemental standard piece F¹ is provided at its upper end with a guide $f^{10}$, preferably in the form of an integral plate or flange thereon which engages the coöperating guides $g$ of the slide G, which is connected to the main tongue C by a hinge strap C² and horizontal pin or bolt $c$. The slide G has a longitudinal slot $g^1$ therein which limits the sliding movement of the main tongue in respect to the stub tongue and the tongue truck by engagement with the hub $b$ on the hinge plate B¹ of the stub tongue.

To cause the backward sliding movement of the main tongue in respect to the stub tongue to lock or hold the two tongues rigidly together and in line with each other, I provide the main tongue and stub tongue with interengaging holding or locking devices which are engaged by the backward sliding movement of the main tongue in respect to the stub tongue and which are disengaged by the forward sliding movement of the main tongue in respect to the stub tongue. These holding devices may be of any suitable kind or construction, but preferably consist of a tapered end G¹ on the slide G and a socket B² on the hinge plate B' of the stub tongue B. To cause the main tongue to be again pushed forward after the backing operation is finished when the machine is again pulled forward by strain of the draft rod C⁶, and thus again leave the stub tongue and tongue truck free to turn in respect to each other, I provide the draft rod C⁶ with a hinged arm or long clevis H connected by a pivot pin or bolt h to the stub tongue and at its outer end by a pivot pin or bolt h¹ to the draft rod C⁶ and connect the outer end of this hinged arm or clevis H with the main tongue by a push rod or toggle arm H¹, the same being preferably connected to the tongue through the evener support C¹ by a bracket h² having an eye h³ engaging an eye h⁴ on the front end of the push rod H¹. The pulling strain on the draft rod C⁶ tends to straighten out or swing inward the hinged arm H and thus cause the push rod H¹ to push the tongue C forward and free the slide G from its locking socket or projection B² on the stub tongue B. The evener supporting arm C¹ is preferably provided with a downwardly extending brace C; having a curved end C¹⁰ connected by the bolt C¹¹ to a downwardly extending projection C¹² on the hinge plate C².

To limit the horizontal turning movement of the main tongue and of the short or stub axles D² carrying the wheels in respect to the stub or supplemental tongue B and prevent danger of the inside horse coming in contact with the reel, I provide a stop connection K, preferably a chain or flexible connection between the main tongue C and stub tongue B. This chain or stop connection K is preferably attached at one end to the stub tongue B by an eye bolt k and at its other end to the slide G, which is provided with an eye g⁴ on its under side to receive the end of the chain K and thus limit the turning movement of the main tongue and truck wheels in respect to the stub tongue B. This chain should be long enough to permit the main tongue to swing around either way a quarter turn or through an arc of about ninety degrees to either side.

As in my invention the wheels of the tongue truck are mounted on short or stub axles and connected by steering arms and a steering bar with the main tongue through the upright pivot pin and its steering arm, the tongue truck may be readily turned very shortly or at right angles, and the harvester or other machine connected to the tongue truck thus also given a short or right angle turn by reason of the pivotal connection between the main tongue and upright pivot pin of the truck with the stub or supplemental tongue of the harvester; while at the same time by reason of the sliding connection between the stub tongue and main tongue and the devices for locking or holding the two tongues rigidly together, the harvester or machine may be readily backed in a straight line, this operation being facilitated by the horizontally oscillatory connection between the main axle of the truck and the truck bolster or frame piece, which adapts the main axle to assume a right angle position in backing; and the free oscillatory movement of the main axle in respect to the truck frame piece or bolster also enables my tongue truck to automatically adjust the stubbleward inclination of the truck wheels to the amount of side draft as the same may vary from time to time owing to varying conditions of ground or grain.

As in my invention the horizontally oscillatory main axle of the truck is pivotally connected to the truck frame piece or bolster on the grain side of the middle, the outer truck wheel tends to swing backward, thus throwing the inner truck wheel adjacent to the grain slightly in advance of the outer truck wheel and giving the truck wheels a stubbleward inclination sufficient to counteract the side draft of the harvester or machine.

I claim:—

1. In a tongue truck for harvesters or other machines, the combination with a stub or supplemental tongue, connected to the machine, and a main tongue, of a tongue truck frame piece or bolster, an upright laterally rocking standard pivotally connected at its lower end to said truck frame piece and connected at its upper end to said stub or supplemental tongue, an upper or supplemental standard having a sliding connection with said main tongue, an upright pivot pin pivotally connecting said main and supplemental standards and provided with a horizontally projecting steering arm, a horizontally oscillatory main axle having a pivotal connection to said truck frame piece or bolster at one end, a pair of short or stub axles hinged to the ends of said main axle and provided with steering arms, and a steering bar connecting said steering arms on the stub axles with the steering arm on the upright pivot pin of the truck, locking or holding devices connected to the main tongue and stub tongue respectively for holding or locking the tongues in line with each other in backing, a draft rod, and a push rod connected thereto at one end and having at the other end a connection with the main tongue to disengage said tongue locking or holding devices from each other in pulling, substantially as specified.

2. The combination with a main tongue and a stub or supplemental tongue, of a tongue truck having a horizontally oscillatory main axle oscillatory in respect to both the main tongue and stub tongue and a pair of stub axles hinged to the ends of the main axle upon which the wheels are mounted and provided with steering arms, a steering bar, and a connection between the steering bar and main tongue, substantially as specified.

3. The combination with a main tongue and a stub or supplemental tongue, of a two wheeled tongue truck having a main axle and a pair of stub axles hinged to the main axle upon which the wheels are mounted, and provided with steering arms, a steering bar connected thereto, means connecting the steering bar with the main tongue and means for locking or holding the main tongue and stub tongue rigidly together in backing, substantially as specified.

4. The combination with a main tongue and a stub or supplemental tongue, of a two wheeled tongue truck having a main axle and a pair of stub axles hinged to the main axle upon which the wheels are mounted, and provided with steering arms, a steering bar connected thereto, means connecting the steering bar with the main tongue and means for locking or holding the main tongue and stub tongue rigidly together in backing, with the main axle and stub axles at right angles to the main tongue, substantially as specified.

5. The combination with a main tongue and a stub tongue, of a tongue truck having a main axle and a pair of stub axles hinged thereto and provided with wheels and steering arms and a steering bar, and an upright pivot pin having a steering arm connected with the steering bar and moving with the main tongue, substantially as specified.

6. The combination with a stub tongue, of a main tongue having a pivotal and a sliding connection with each other, of a two wheeled tongue truck having a main axle and stub axles hinged thereto furnished with steering arms and connected to the main tongue, substantially as specified.

7. The combination with a stub tongue, of a main tongue having a pivotal and a sliding connection with each other, of a two wheeled tongue truck having a main axle and stub axles hinged thereto furnished with steering arms and connected to the main tongue, and means whereby the sliding movement of the main tongue in respect to the stub tongue locks the two tongues together in backing, substantially as specified.

8. The combination with a stub tongue, of a main tongue having a pivotal and a sliding connection with each other, of a two wheeled tongue truck having a main axle and stub axles hinged thereto furnished with steering arms and connected to the main tongue, and locking or holding devices on the main and supplemental tongues engageable by the backward movement of the main tongue and disengageable by the forward movement of the main tongue in respect to the stub tongue, substantially as specified.

9. The combination with a stub or supplemental tongue attached to a machine, of a main tongue having a pivotal and a sliding connection with the stub tongue and a tongue truck having a main shaft, hinged stub shafts provided with steering arms, and a steering bar connected with and operated by the main tongue, substantially as specified.

10. The combination with a stub or supplemental tongue attached to a machine, of a main tongue having a pivotal and a sliding connection with the stub tongue and a tongue truck having a main shaft, hinged stub shafts provided with steering arms and a steering bar connected with and operated by the main tongue, and interengaging devices for holding the main tongue and supplemental tongue from turning or swinging horizontally in respect to each other, substantially as specified.

11. The combination with a stub or supplemental tongue attached to a machine, of a main tongue having a pivotal and a sliding connection with the stub tongue and a tongue truck having a main shaft, hinged stub shafts provided with steering arms and a steering bar connected with and operated by the main tongue, and inter-engaging devices for holding the main tongue and supplemental tongue from turning or swinging horizontally in respect to each other, said holding devices being engaged by the backward movement of the main tongue and disengaged by its forward movement, substantially as specified.

12. The combination with a stub or supplemental tongue attached to a machine, of a main tongue having a pivotal and a sliding connection with the stub tongue and a tongue truck having a main shaft, hinged stub shafts provided with steering arms and a steering bar connected with and operated by the main tongue, and inter-engaging devices for holding the main tongue and supplemental tongue from turning or swinging horizontally in respect to each other, said holding devices being engaged by the backward movement of the main tongue and disengaged by its forward movement, a draft rod having a hinged arm extending at an angle to the stub tongue and a push rod or toggle arm extending from said hinged arm and connected to the main tongue to push it forward and disengage said holding devices when draft is applied to the draft rod, substantially as specified.

13. The combination with a stub or supplemental tongue, of a main tongue pivotally connected thereto and a tongue truck having a horizontally oscillatory main axle, oscillatory in respect to both the main tongue and stub tongue, stub axles hinged thereto and furnished with steering arms and a steering bar connected to the main tongue, substantially as specified.

14. The combination with a stub or supplemental tongue, of a main tongue having a pivotal connection with said stub tongue, of a tongue truck having a frame piece or bolster, a main axle adapted to oscillate horizontally in said frame piece or bolster to enable it to assume a right angle position in respect to the tongues in backing, and an inclined position in pulling, a pair of stub axles hinged to said main axles and furnished with steering arms and a steering bar connected with the main tongue so that the wheels may be turned parallel with the main tongue in backing, substantially as specified.

15. The combination with a stub or supplemental tongue, of a main tongue having a pivotal connection with said stub tongue, of a tongue truck having a frame piece or bolster, a main axle adapted to oscillate horizontally in said frame piece or bolster to enable it to assume a right angle position in respect to the tongues in backing and an inclined position in pulling, a pair of stub axles hinged to said main axles and furnished with steering arms and a steering bar connected with the main tongue so that the wheels may be turned parallel with the main tongue in backing, said connection between the main tongue and the steering bar comprising an upright pivot pin furnished with a steering arm, substantially as specified.

16. The combination with a main and stub tongue, of a tongue truck frame piece or bolster, a horizontally oscillatory main axle mounted therein provided with hinged stub axles at the ends thereof furnished with steering arms and a steering bar, an upright standard secured to the stub tongue, a supplemental standard above the same provided with a guide at its upper end, a slide connected with the main tongue, an upright pivot pin connected to said supplemental standard and provided with a steering arm connected with the steering bar, substantially as specified.

17. The combination with a stub tongue and a main tongue, of a tongue truck frame piece or bolster, a horizontally oscillatory main axle mounted therein provided with hinged stub axles at the ends thereof furnished with steering arms and a steering bar, an upright standard secured to the stub tongue, a supplemental standard above the same provided with a guide at its upper end, a slide connected with the main tongue, an upright pivot pin connected to said supplemental standard and provided with a steering arm connected with the steering bar, said stub tongue having a socket to engage the said slide on the main tongue and hold the two tongues rigid in backing, substantially as specified.

18. The combination with a stub tongue and a main tongue, of a tongue truck frame piece or bolster, a horizontally oscillatory main axle mounted therein, provided with hinged stub axles at the ends thereof furnished with steering arms and a steering bar, an upright standard secured to the stub tongue, a supplemental standard above the same provided with a guide at its upper end, a slide connected with the main tongue, an upright pivot pin connected to said supplemental standard and provided with a steering arm connected with the steering bar, said stub tongue having a socket to engage the said slide on the main tongue and hold the two tongues rigid in backing, a draft rod and a push rod connected thereto and to the main tongue to cause the holding device on the main tongue to disengage the holding device on the stub tongue in pulling, substantially as specified.

19. The combination with a main tongue and a stub tongue pivotally connected together, of a tongue truck having a main axle and hinged stub axles furnished with steering arms and a steering bar connected with the main tongue and means for locking or holding the two tongues rigidly together in backing, substantially as specified.

20. The combination with a main tongue and a stub tongue pivotally and slidably connected together, of a tongue truck having a main axle and hinged stub axles furnished with steering arms and a steering bar connected with the main tongue and means for locking or holding the two tongues rigidly together in backing, said means for locking or holding the two tongues rigidly together being engageable by the backward movement of the main tongue and disengageable by the forward movement of the main tongue, substantially as specified.

21. The combination with a main tongue and a stub tongue pivotally connected together, of a tongue truck having a main axle, hinged stub axles furnished with wheels, and steering arms and a steering bar connected with the main tongue, said main axle having a horizontally oscillatory movement in respect to the stub tongue and main tongue, substantially as specified.

22. The combination with the main tongue and supplemental tongue, of a tongue truck having a main axle and hinged stub axles and forward and stubbleward inclined wheels on said stub axles, a steering bar connected with the main tongue, steering arms on the stub axles connected to the steering bar, and means for causing the truck wheels to automatically assume a position parallel to the main tongue in backing, substantially as specified.

23. The combination with the main and stub tongues pivotally connected together, of a tongue truck having a main axle and a pair of hinged stub axles furnished with steering arms and a steering bar connected to the main tongue, of means for automatically locking or holding the main tongue and stub tongues from turning in respect to each other in backing, substantially as specified.

24. The combination with the main and stub tongues pivotally connected together, of a tongue truck having a main axle and a pair of hinged stub axles furnished with steering arms and a steering bar connected to the main tongue, of means for automatically locking or holding the main tongue and stub tongues from turning in respect to each other in backing, said means being engageable by backward pressure on the main tongue and disengageable by forward pressure on the main tongue, substantially as specified.

25. The combination with the main and stub tongues pivotally connected together, of a tongue truck having a main axle and a pair of hinged stub axles furnished with steering arms and a steering bar connected to the main tongue, of means for automatically locking or holding the main tongue and stub tongues from turning in respect to each other in backing, said means being engageable by backward pressure on the main tongue and disengageable by forward pressure on the main tongue, the wheels of said tongue truck being stubbleward inclined and the tongue truck having means to cause the truck wheels to automatically assume a position parallel to the main tongue in backing, substantially as specified.

26. The combination with a main tongue and a stub tongue, of a tongue truck frame piece or bolster, a main axle, stub axles furnished with wheels, steering arms, a steering bar, said frame piece or bolster having a pivotal connection at one end with the main axle and a slotted connection therewith at the other, substantially as specified.

27. The combination with a main tongue and a stub tongue, of a tongue truck frame piece or bolster, a main axle, stub axles furnished with wheels and steering arms, a steering bar, said frame piece or bolster having a pivotal connection at one end with the main axle and a slotted connection therewith at the other, and adjustable stops for limiting the horizontally oscillatory movement of the axle in respect to said truck frame piece or bolster, substantially as specified.

28. The combination with a main tongue and a stub tongue, of a tongue truck frame piece or bolster, a main axle, stub axles furnished with wheels and steering arms, a steering bar, said frame piece or bolster having a pivotal connection at one end with the main axle and a slotted connection therewith at the other, and a laterally rocking upright standard pivotally connected at its lower end to said truck frame piece or bolster, substantially as specified.

29. The combination with a main tongue and a stub tongue, of a tongue truck frame piece or bolster, a main axle, stub axles furnished with wheels and steering arms, a steering bar, said frame piece or bolster having a pivotal connection at one end with the main axle and a slotted connection therewith at the other, and a laterally rocking upright standard pivotally connected at its lower end to said truck frame piece or bolster, and a supplemental upright standard and a pivot pin having a steering arm connected with said steering bar, substantially as specified.

30. The combination with the main tongue and a stub tongue, of a tongue truck frame piece or bolster, a main axle, stub axles furnished with wheels and steering arms, a steering bar, said frame piece or bolster having a pivotal connection at one end with the main axle and a slotted connection therewith at the other, and a laterally rocking upright standard pivotally connected at its lower end to said truck frame piece or bolster, a supplemental upright standard, and a pivot pin having a steering arm connected with said steering bar, and a slide connected with said main tongue, substantially as specified.

31. The combination with a main tongue and a stub tongue, of a tongue truck frame piece or bolster, a main axle, stub axles furnished with wheels and steering arms, a steering bar, said frame piece or bolster having a pivotal connection at one end with the main axle and a slotted connection therewith at the other, and a laterally rocking upright standard pivotally connected at its lower end to said truck frame piece or bolster, a supplemental upright standard and a pivot pin having a steering arm connected with said steering bar, and a slide connected with said main tongue, said stub tongue having a socket to engage said slide, substantially as specified.

WILLIAM M. WADLEIGH.

Witnesses:
H. M. MUNDAY,
PEARL ABRAMS.